(No Model)

L. ECKEL.
CAKE CUTTER AND MOLD.

No. 583,301. Patented May 25, 1897.

WITNESSES:
Henry W. Miller
Frank J. Otey

INVENTOR
Louis Eckel

UNITED STATES PATENT OFFICE.

LOUIS ECKEL, OF WEST HOBOKEN, NEW JERSEY.

CAKE CUTTER AND MOLD.

SPECIFICATION forming part of Letters Patent No. 583,301, dated May 25, 1897.

Application filed September 30, 1896. Serial No. 607,378. (No model.)

*To all whom it may concern:*

Be it known that I, LOUIS ECKEL, a citizen of the United States, residing at West Hoboken, in the county of Hudson and State of New Jersey, have invented certain new and useful Improvements in Cake Cutters and Molds; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to molds and cutters for fashioning biscuits, cakes, and articles of corresponding nature from dough; and its objects are, first, to divide from the suitably-rolled material portions substantially alike in exterior formation and equal in weight; second, to render unnecessary actual contact between the hands of the operator and the dough; third, to provide devices for effectively loosening the dough from the mold and cutter; fourth, to furnish reliable means for automatically discharging the mold, and, fifth, to accomplish these objects by constructions at once simple, durable, cheap, easily cleansed, and readily manufactured.

Each constituent element of my invention is described in detail and its office, together with the mode of operation of the whole, fully explained hereinafter.

Figure 1:
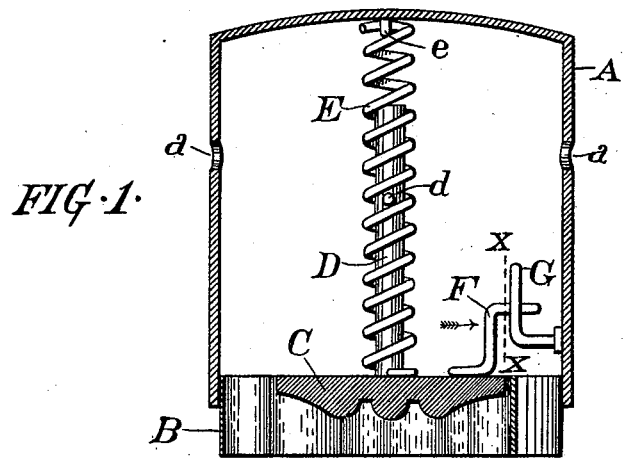
Figure 2:
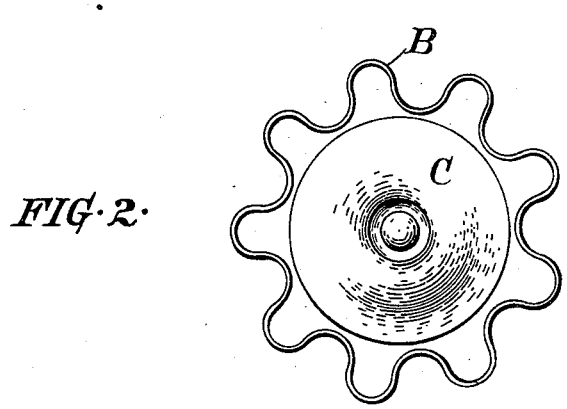
Figure 4:
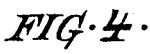
Figure 3:
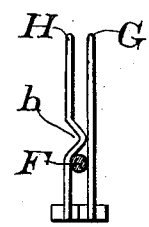
Figure 3:
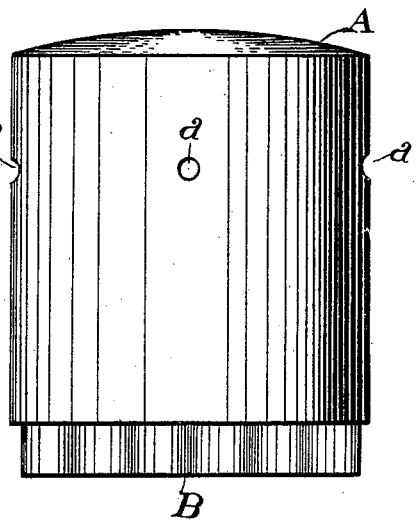

Referring to the accompanying drawings, wherein like letters are employed to designate like parts throughout the several views, Figure 1 represents a vertical sectional view of cutter, piston, mold, and casing, the stem, spring, and vibrator appearing in full side elevations. Fig. 2 represents a bottom plan of cutter and mold. Fig. 3 represents an exterior view of cutter and casing. Fig. 4 represents a view in the direction of the arrow in Fig. 1, showing the vibrator-springs and the bent finger cut upon line X X, leaving a portion between the springs.

Considering Figs. 1 and 3, letter A designates the hollow casing, forming also the handle of the device. To fit the hand, the top of the casing is made convex, although that contour is not essential. It will be observed that the orifices $a$ through the casing are located at the sides and not through the top, where they might be obstructed by the palms of the hands.

B marks the cutter, which may be of any selected configuration. (See Fig. 2.)

C designates the molding-piston, consisting of a cast or stamped design in relief or intaglio centrally fixed to the stem D. By means of the pin $d$, driven into the stem, the piston, as well as the stem, is yieldingly supported by the coiled spring E. Spring E encircles the stem and extends from the upper surface of the piston to the top of the hollow casing, where it is hooked through the interior staple $e$ or otherwise conveniently secured.

In order that the formed dough may not cling too tightly to mold and cutter, I introduce a vibrator consisting of the bent finger F, soldered upon the upper surface of the piston, (see Fig. 1,) and the flat elbow-springs G H, soldered together upon the interior of the casing and having portions arranged perpendicular to the piston and parallel to each other. In one of the elbow-springs H a bend $h$ is formed at a suitable point in the perpendicular portion of that spring. Normally, Fig. 4, the finger F rests below the bend $h$, and it of course moves with the piston. Spring G holds finger F yieldingly against spring H.

While spring G is preferred it is not an element absolutely required, as a rigid wire could clearly be substituted to limit the lateral movement of the finger. Suitably chosen, spring H would prove sufficiently yielding. Should it be desired in order to more effectively expel the formed dough that the piston be moved in each operation to a lower point relatively to cutter B than that shown in Fig. 1, the extended point of finger F may plainly move downwardly between the springs. (See Fig. 4.) The position represented is ordinarily far enough down for all practical purposes.

The mode of operation of my invention may be described as follows: Pressed into a layer of dough the cutter divides the amount desired into the selected peripheral outline and prevents it from spreading. Piston C is forced upwardly by the entering material, which is at the same time molded according to the pattern adopted. As piston C rises a slight tremor or vibration is given it by finger F in passing bend *h* of elbow-spring H. When the whole is lifted, the piston is returned by the reaction of spring E and another vibration or tremor results, this time both piston and casing, with the attached cutter, partaking of the jarring movement. Thus loosened the formed portion of dough is readily discharged without any noticeable modification of its molded form. The operation is then repeated.

I am aware that cake cutters and molds have been publicly used which employ cutters and piston-expellers, and I do not claim those features, broadly.

What I do claim, and desire to protect by Letters Patent of the United States, is—

1. In a cake cutter and mold, the combination of hollow casing A provided with orifices, a cutter fixed to the casing, a piston possessing a suitable molding-face, stem D attached to said piston and possessing pin *d*, spring E connected with said casing interiorly whereby said piston may be yieldingly held vertically movable within said cutter, and spring-operated devices constructed and arranged to vibrate said piston and stem during the reciprocative movement of those parts, substantially as described.

2. In a cake cutter and mold, the combination of hollow casing A provided with orifices, a cutter fixed to the casing, a piston possessing a suitable molding-face, stem D attached to said piston and possessing pin *d*, spring E connected with said casing interiorly whereby said piston may be yieldingly held vertically movable within said cutter, and finger F fixed to the piston, springs G and H, joined to the casing interiorly, spring H having bend *h*, substantially as described.

In testimony whereof I affix my signature in presence of two witnesses.

LOUIS ECKEL.

Witnesses:
   JAMES H. SKINNER,
   ALFRED TSCHINKEL.